United States Patent
Kogan et al.

(10) Patent No.: US 10,169,853 B2
(45) Date of Patent: Jan. 1, 2019

(54) SCORE WEIGHTS FOR USER INTERFACE (UI) ELEMENTS

(71) Applicant: Hewlett Packard Enterprise Development LP, Houston, TX (US)

(72) Inventors: Olga Kogan, Yehud (IL); Amit Levin, Yehud (IL); Ilan Shufer, Tel Aviv (IL)

(73) Assignee: ENTIT SOFTWARE LLC, Sunnyvale, CA (US)

(*) Notice: Subject to any disclaimer, the term of this patent is extended or adjusted under 35 U.S.C. 154(b) by 62 days.

(21) Appl. No.: 15/384,817

(22) Filed: Dec. 20, 2016

(65) Prior Publication Data

US 2018/0174288 A1  Jun. 21, 2018

(51) Int. Cl.
| | |
|---|---|
| *G06K 9/00* | (2006.01) |
| *G06T 7/00* | (2017.01) |
| *G06N 99/00* | (2010.01) |
| *G06K 9/18* | (2006.01) |
| *G06K 9/62* | (2006.01) |
| *G06K 9/46* | (2006.01) |

(52) U.S. Cl.
CPC .............. *G06T 7/0002* (2013.01); *G06K 9/00* (2013.01); *G06K 9/18* (2013.01); *G06K 9/4647* (2013.01); *G06K 9/4652* (2013.01); *G06K 9/6218* (2013.01); *G06N 99/005* (2013.01); *G06T 2200/24* (2013.01); *G06T 2207/20072* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 8,495,575 B2 | 7/2013 | Rau et al. | |
| 8,713,684 B2 * | 4/2014 | Bettini | G06F 21/57 726/1 |
| 8,997,081 B1 * | 3/2015 | Manion | G06F 8/65 717/168 |
| 9,141,518 B2 | 9/2015 | Bharadwaj et al. | |
| 2008/0148235 A1 | 6/2008 | Foresti et al. | |
| 2014/0143758 A1 | 5/2014 | Peisachov | |
| 2015/0106384 A1 * | 4/2015 | Go | G06F 8/77 707/748 |

(Continued)

FOREIGN PATENT DOCUMENTS

EP  1890235 A1  2/2008

OTHER PUBLICATIONS

Whitman, K. et al., "Automatic Android GUI Traversal with High Coverage," (Research Paper), Communication Systems and Network Technologies (CSNT), 2014 Fourth International Conference on, IEEE, 2014, 6 pages.

*Primary Examiner* — Shervin Nakhjavan (57) ABSTRACT

An example device in accordance with an aspect of the present disclosure includes an identification engine, a clustering engine, and a weighting engine. The identification engine is to identify User Interface (UI) elements of an application under test based on an image processing analysis of screens of the application under test. The clustering engine is to cluster the UI elements into at least one cluster based on at least one feature of the UI elements. The weighting engine is to assign score weights to the UI elements of a given screen according to which of the at least one cluster that a given one of the UI elements is clustered in.

20 Claims, 6 Drawing Sheets

(56) References Cited

U.S. PATENT DOCUMENTS

| | | | |
|---|---|---|---|
| 2015/0248429 A1* | 9/2015 | Pregueiro | G06F 17/212 |
| | | | 715/202 |
| 2015/0301926 A1 | 10/2015 | Giannelos | |
| 2017/0185253 A1* | 6/2017 | Vaglio | G06F 3/0484 |

\* cited by examiner

SCORE WEIGHTS FOR USER INTERFACE (UI) ELEMENTS

BACKGROUND

Application testing can provide information about an application under test ("AUT"), e.g., to determine whether the AUT includes errors or other defects. Testing may be performed manually, where results are based on user interaction with the AUT, and also may be performed automatically.

DETAILED DESCRIPTION

Testing an AUT can be based on user interaction, to measure how user-friendly, efficient, or convenient an application is for end-users. The degree to which the AUT is tested during testing may be estimated based on tracking input device-based user actions (e.g., keyboard inputs and mouse moves), as well as the visual perception and visual analysis of a human tester. However, it is also beneficial to identify how much coverage of the AUT has been accomplished by the testing. Manual or automated user interface ("UI") testing can use manual logging of user actions, and/or automatic detection of user actions that involve mouse, touch or other types of computer inputs. The tests can be assigned to specific features or testing areas, and the number of executed tests can provide some estimate of testing coverage by calculating how many tests were executed successfully. Calculating the UI coverage score can be based on how many UI elements have been covered by the tester (by clicking, typing, touch or other types of computer inputs, as well as by using eye tracking) vs. UI elements that haven't been covered.

However, it is beneficial to have greater insight as to what portions of the AUT were tested. Elements on a given screen can have the varying significance or impact on the application flow. For example, a tester may decide that menus, buttons, or other navigational elements are more significant to cover than labels or other informative UI elements. Because some portions of an AUT can be more significant for testing than others, it is beneficial to achieve test coverage scoring that reflects whether significant portions of the AUT were covered by the testing.

Accordingly, some example implementations described herein can identify UI coverage testing scores using automatic classification of UI elements for application screens covered by a test. Thus, the UI coverage score can measure how much of an application's UI has been covered by the tests, as well as weighting the score of covered UI elements according to types of UI elements covered. In some implementations, a testing coverage device can include various engines to enable UI element classification to provide an advanced approach for calculating the UI coverage score by giving different weights to different categories of UI elements. For example, an identification engine is to identify, based on an image processing analysis of screens of an application under test, User Interface (UI) elements of the application under test. A clustering engine is to cluster the UI elements into at least one cluster based on at least one feature of the UI elements. A weighting engine is to assign score weights to the UI elements according to which of the at least one cluster that a given one of the UI elements is clustered in. A testing coverage engine is to automatically identify, based on the score weights of which UI elements are covered by the test, a testing coverage score of the application under test.

Some example implementations can analyze the AUT based on screenshots, and may identify, based on an image processing analysis of a set of screenshots of an AUT, principal application screens that represent a set of test executions of the AUT, identify user interface ("UI") elements in the principal applications screens and weight the various UI elements differently, and automatically identify, based on user interaction and the score weights, a testing coverage of the AUT. As used herein, a screenshot may be considered to be any image that captures UI output. For example, a screenshot may be a digital image created using an application running on a client device (e.g., client device 120), a digital image captured by a camera (e.g., a still camera and/or video camera), a digital image created by a device intercepting the video output of a display, and the like.

Some example implementations can automatically understand and use the visual language of an application, and are not limited to image-based testing. By determining a UI coverage score, example implementations have the benefit of achieving results independent of any particular kind of rendering technique of a given web-browser, operating system, and/or application window, because example clustering approaches can check for "similar" elements without needing to predefine a particular size, color, or other feature for the similarities. Furthermore, UI changes do not affect the results, because the "language" of the look and feel of an application, with consistent/distinct visual characteristics for given types of elements, can automatically be detected and categorized/clustered. Thus, it is possible to calculate a UI coverage score using automatic classification of UI elements for each application screen covered by a test, with the UI coverage score providing a measure of how much of an application's UI has been covered by the tests. Example implementations described herein can give more weight to certain UI elements vs. other elements when calculating a UI coverage score, thereby providing more indicative measurement for the testers and Quality Assurance (QA) managers.

Figure 1:
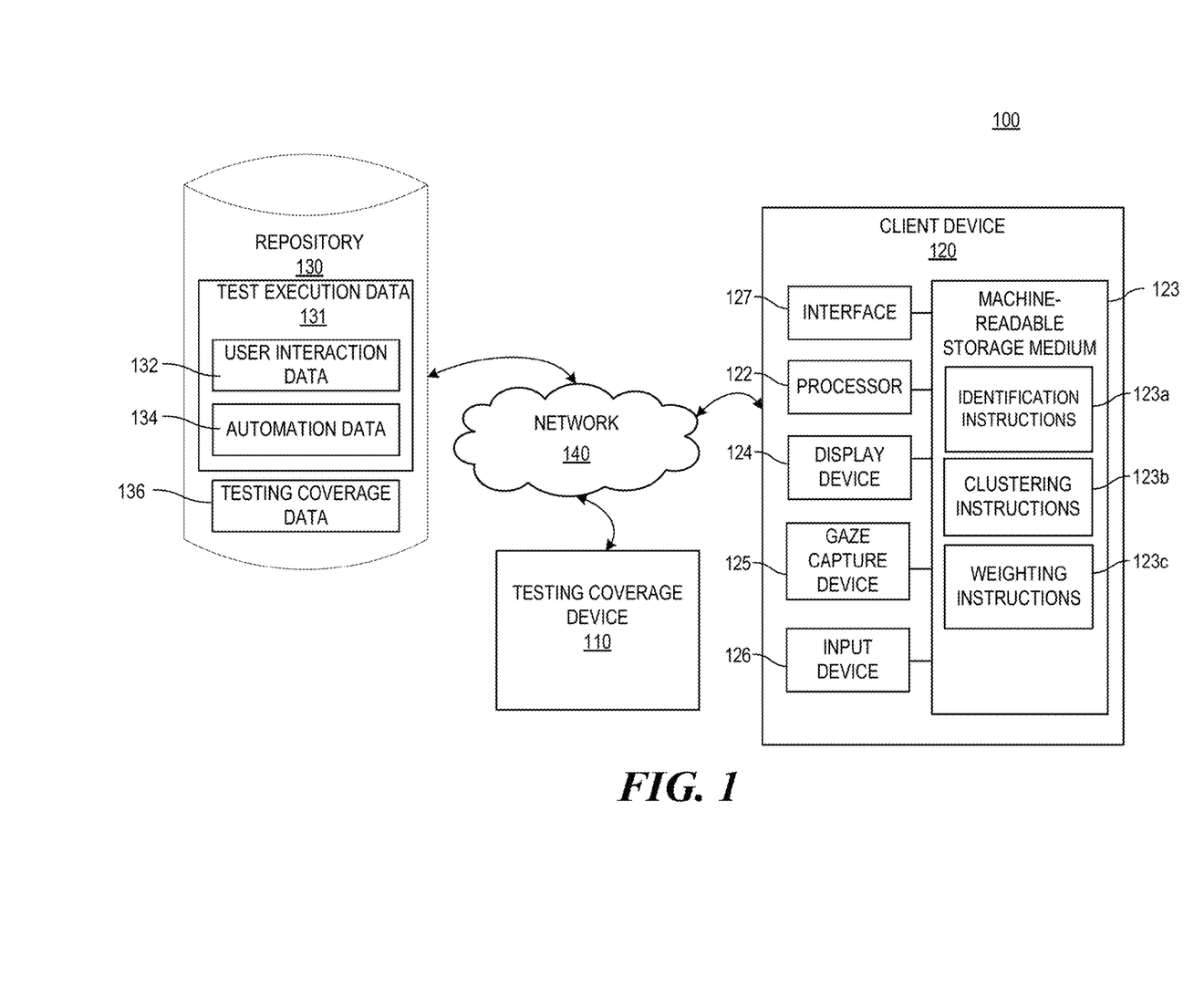
FIG. 1 is a block diagram of an example system for determining testing coverages consistent with disclosed implementations.

Referring now to the drawings, FIG. 1 is a block diagram of an example system 100 for determining testing coverages consistent with disclosed implementations. System 100 may be implemented in a number of different configurations without departing from the scope of the disclosed examples. In the example shown in FIG. 1, system 100 may include a testing coverage device 110, a client device 120, a repository 130, and a network 140 for connecting testing coverage device 110 with client device 120 and/or repository 130.

Testing coverage device 110 may be a computing system that performs various functions consistent with disclosed examples. For example, testing coverage device 110 may be a server, a desktop computer, a laptop computer, and/or any other suitable type of computing device. In some examples, testing coverage device 110 may process information received from client device 120 and/or repository 130. For example, testing coverage device 110 may determine testing coverage based on user interaction data captured from client device 120 and/or received from repository 130. Examples of testing coverage device 110 and certain functions that may be performed by device 110 are described in greater detail below.

Client device 120 may be a computing system operated by a user. For example, client device 120 may be a desktop computer, a laptop computer, a tablet computing device, a mobile phone, and/or any other suitable type of computing device. In some examples, client device 120 may be a computing device to perform operations consistent with certain disclosed implementations. For example, client device 120 may transmit data (e.g., gaze data, input data, and/or other forms of user interaction data) related to test executions of an AUT to testing coverage device 110.

Client device 120 may include a processor to execute instructions stored in a machine-readable storage medium. In the example shown in FIG. 1, client device 120 may include a processor 122, a machine-readable storage medium 123, a display device 124, a gaze capture device 125, input device(s) 126, and an interface 127. Processor 122 of client device 120 may be at least one processing unit (CPU), microprocessor, and/or another hardware device to execute instructions to perform operations. For example, processor 122 may fetch, decode, and execute instructions stored in machine-readable storage medium 123 to test an AUT, such as identification instructions 123a (e.g., instructions related to identifying UI elements), clustering instructions 123b (e.g., instructions related to clustering UI element(s) into cluster(s) based on feature(s)), and/or weighting instructions 123c (e.g., instructions related to assigning score weights to the UI elements). While in the example shown in FIG. 1 instructions 123a, 123b, and 123c reside on client device 120, instructions 123a, 123b, and/or 123c may reside on different machines and/or may span multiple computing systems. For example, clustering instructions 123b may reside on a computing device that serves as the backend of the AUT, and that is separate and distinct from client device 120. Machine-readable storage medium 123 may be any electronic, magnetic, optical, or other non-transitory storage device that stores instructions executed by processor 122.

Display device 124 may be any type of display device that presents information (e.g., a UI of an AUT, a test verification interface, etc.) to a user (e.g., a tester) operating client device 120.

Gaze capture device 125 may be any combination of hardware and/or programming that captures gaze data (as one type of user interaction with the AUT). In some implementations, gaze capture device 125 may be a device that captures gaze data that represents where a tester looks on an application screen of an AUT (e.g, a gaze point) and/or how they move their gaze. For example, gaze capture device 125 may be a hardware eye tracker device, a camera (e.g., mounted on a desktop, glasses, mobile device, etc.), and/or any other suitable device capable of collecting gaze data. In some implementations, gaze capture device 125 may be an eye tracker device that comprises near-infrared micro projectors, optical sensors, and an image processing device. The micro projectors may create reflection patterns on human eyes looking at a screen, and the optical sensors may register the image of the user, the user's eyes, and the projection patterns in real-time. The image processing device may be used to find features of the user, the eyes, and the projection pattern, and models may be applied to calculate gaze capture data, such as the eyes' position and gaze point (e.g., [x,y] coordinates) on a display of an application screen of the AUT, the length of time spent at the gaze point, the order in which the gaze point was viewed relative to other gaze points, and/or the like. The gaze data may be transmitted to a repository, such as repository 130, and stored as gaze data 132. While in the example shown in FIG. 1 gaze capture device 125 is part of client device 120, gaze capture device 125 may be separate and distinct from client device 120.

Input device 126 may be any device used to provide input (e.g., various types of user interaction) to client device 120, such as a keyboard, a mouse, a touchpad, a gesture control device, a voice recognition device, and the like.

Interface 127 may be any combination of hardware and/or programming that facilitates the exchange of data between the internal components of client device 120 and external components, such as testing coverage device 110. In some examples, interface 127 may include a network interface device that allows client device 120 to receive and send data to and from various components, such as from client device 120 to repository 130 via network 140.

Repository 130 may be any type of storage system configuration that facilitates the storage of data. In some implementations, repository 130 may facilitate the locating, accessing, and retrieving of data points captured during test executions of an AUT (e.g., SaaS, SQL, Access, etc. databases). For example, repository 130 may store test execution data 131, which may include user interaction data such as gaze data (e.g., data related to where testers looked and moved their gaze, which may include a collection of coordinates (e.g., [x,y]) of a tester's gaze on a particular application screen) and automation data (e.g., data related to where an automated test performed user actions, such as keystrokes or mouse clicks). Repository 130 may also store testing coverage data 136, which may relate to the testing coverage of a single test or the testing coverage of aggregated tests.

Repository 130 can be populated by a number of methods. For example, testing coverage device 110 may populate repository 130 with test execution data captured by input device(s) 126 and gaze capture device 125 of client device 120, and store the test execution data as test execution data 131 in repository 130. While in the example shown in FIG. 1 the test execution data 131 and testing coverage data 136 reside in repository 130, any portion of the test execution data 131 and/or testing coverage data 136 may reside on different storage systems. Furthermore, while in the example shown in FIG. 1 repository 130 is a single component external to components 110 and 120, repository 130 may comprise separate components and/or may be part of devices 110, 120, and/or another device. In some implementations, repository 130 may be managed by components of device 110 and/or other devices that are capable of accessing, creating, controlling and/or otherwise managing data remotely through network 140.

Network 140 may be any type of network that facilitates communication between remote components, such as testing coverage device 110 and client device 120. For example, network 140 may be a local area network (LAN), a wide area network (WAN), a virtual private network, a dedicated intranet, the Internet, and/or a wireless network.

Figure 2:
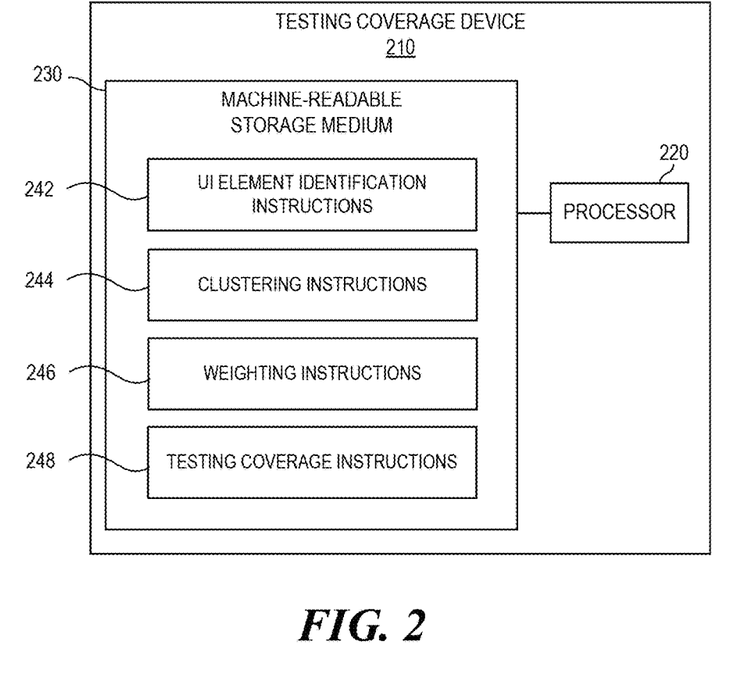
FIG. 2 is a block diagram of an example testing coverage device consistent with disclosed implementations.

The arrangement illustrated in FIG. 1 is an example, and system 100 may be implemented in a number of different configurations. For example, while FIG. 1 shows one testing coverage device 110, client device 120, repository 130, and network 140, system 100 may include any number of components 110, 120, 130, and 140, as well as other components not depicted in FIG. 1. For example, the machine-readable storage medium 123 can include additional instructions, such as testing coverage instructions as shown in FIG. 2. Furthermore, system 100 may omit any of components 110, 120, 130, and 140, and/or the functionality of at least one of components 110, 120, 130, and 140 may be incorporated into another component (e.g., components 110, 120, 130, 140, and/or a component not shown in FIG. 1). As another example, system 100 may include multiple client devices 120, such as two client devices. A first client device (e.g., a functional testing as a service device ("FTaaS device")) may cause the display of the AUT on the display device 124 to be mirrored to a second client device (e.g., a client device accessed by a tester and that runs input device(s) and/or a gaze capture device). In this way, a tester may perform actions on the AUT as if it were running on the testers client device.

FIG. 2 is a block diagram of an example testing coverage device 210 consistent with disclosed implementations. In certain aspects, testing coverage device 210 may correspond to testing coverage device 110 of FIG. 1. Testing coverage device 210 may be implemented in various ways. For example, testing coverage device 210 may be a special purpose computer, a server, a mainframe computer, and/or any other suitable type of computing device. In the example shown in FIG. 2, testing coverage device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute instructions 242, 244, 246 and/or 248 stored in machine-readable storage medium 230 to perform operations consistent with disclosed examples.

Machine-readable storage medium 230 may be any electronic, magnetic, optical, and/or other physical storage device that stores executable instructions. Thus, machine-readable storage medium 230 may be, for example, memory, a storage drive, an optical disc, and the like. In some implementations, machine-readable storage medium 230 may be a non-transitory machine-readable storage medium, where the term "non-transitory" does not encompass transitory propagating signals. Machine-readable storage medium 230 may be encoded with instructions that, when executed by processor 220, perform operations consistent with disclosed implementations. For example, machine-readable storage medium 230 may include instructions that perform operations to determine the testing coverage of an AUT by identifying principal application screens that represent a set of test executions of the AUT, identifying UI elements in the principal application screens, clustering the UI elements into clusters, assigning score weights to the UI elements according to the clusters, and automatically identifying, based on the score weights of the UI elements, the testing coverage score of the testing of the AUT. In the example shown in FIG. 2, machine-readable storage medium 230 may include principal application screen identification instructions (not shown in FIG. 2, see FIG. 4) to identify screens of the AUT to which the instructions 242-248 may be applied. The machine-readable storage medium 230 may also include user interface ("UI") element identification instructions 242, clustering instructions 244, weighting instructions 246, and testing coverage instructions 248.

Principal application screen identification instructions are set forth in greater detail with reference to FIG. 4 below, and operate to identify principal application screens that represent a set of test executions of the AUT for analysis by the instructions 242, 244, 246, and/or 248. In some example implementations, execution of principal application screen identification instructions by processor 220 may cause processor 220 and/or another processor to identify, based on an image processing analysis (e.g., image processing performed by a computing device, such as digital image processing) a set of screenshots of an AUT, principal application screens that represent a set of test executions of the AUT. For example, principal application screen identification instructions may cause processor 220 and/or another processor to identify principal application screens by comparing each of the screenshots in the set of screenshots to each other to identify a subset of screenshots. In some implementations, the subset of screenshots may be identified based on actions occurring during the set of test executions. Examples of identifying principal application screens are described in further detail below with respect to, for example, FIG. 4.

UI element identification instructions 242 may function to identify UI elements in the principal application screens. For example, when UI element identification instructions 242 are executed by processor 220, UI element identification instructions 242 may cause processor 220 to divide the principal application screens into a plurality of UI element areas using various techniques. For example, division of the principal application screens into a plurality of UI element areas can be performed by analyzing the Document Object Model (DOM) or HyperText Markup Language (HTML) of a web page, using image processing, and/or the like. The UI element areas may include a single UI element or grouped UI elements. In some implementations, the UI elements are identified using a combination of image recognition techniques and optical character recognition ("OCR"). For example, identified principal application screens may be analyzed to find text and adjacent text may be grouped together as an element, when an element contains more than one word. The adjacent text may be found using distance thresholds well as additional techniques such as slightly increasing the font size and blurring the text pixels. Additionally, menu elements may be identified at the left, right, or upper parts of the principal application screen by identifying elements that are aligned vertically or horizontally and appear on multiple screens at approximately the same area. In some implementations, elements that are aligned vertically and/or horizontally and appear in many application screens can be grouped together. For example, multiple UI elements may be joined together to create a particular UI element area. In some example implementations, buttons and UI controls may be identified by finding rectangles. In some implementations, the principal application screens may be converted to black and white images to increase the contrast and thereby increase the accuracy and edge detection that are applied to the screens.

Clustering instructions 244 are to cluster the UI elements into at least one cluster based on at least one feature of the UI elements. It may be that the UI elements do not have the same significance when determining the test coverage. For example, UI buttons, menus, and/or input fields can be more significant to check whether they have been covered by a test, compared to an informative/passive message or label. The clustering instructions 244 can cluster the UI elements based on various features, including a histogram of colors of the UI elements or a histogram of intensity of the UI elements. This is possible because it is very likely that there is a specific look and feel for a given application under test, such as those having a distinct UI design with certain styles for buttons, menus, etc. The histogram can be based on a numeric representation of colors that are used in a specific image/UI element. Images can be converted to grayscale, and histograms can be used on the grayscale images.

The clustering instructions 244 can cluster the UI elements based on a machine learning unsupervised clustering technique, without needing user intervention. In an example, clustering can be used to produce complex multidimensional matrix of UI elements and their features. The clustering instructions 244 can perform Optical Character Recognition (OCR) on the UI elements, and group the UI elements into a first group of those UI elements including text, and a second group of those UI elements not including text, and apply clustering to the first group distinct from the second group.

Weighting instructions 246 are to assign score weights to the UI elements according to which of the at least one cluster that a given one of the UI elements is clustered in. Thus, depending on which cluster(s) a UI element is a member of, that UI element can be given more or less weight. As for the type of score/significance to assign to a given cluster (and its members), the weighting instructions can use approaches such as identifying how many elements are in a given cluster to indicate a corresponding level of significance (and score) to be used for that cluster and its members. Other approaches can be used to score a given cluster, such as using logic queries to test whether any of the members of the cluster have significance, receiving user input/customization for cluster score assignment, inferring from additional information such as whether a member of the cluster had been clicked or received user interaction, and the like. In an example, weighting instructions 246 can assign a score weight to a given UI element of a given cluster based on a degree of user interaction with other UI elements of that given cluster to which the given UI element is clustered in. The user interaction can be based on a mouse click on the UI element, user eye gaze duration on the UI element, or the like. The weighting instructions 246 can assign a score weight to a given UI element based on a number of times with which that given UI element has been interacted, independent from the given UI element's cluster. The weighting instructions 246 can assign score weights according to a user-customizable score assigned to a given cluster, and also can assign a score weight with the granularity down to a particular UI element, according to a customizable score assigned to that particular UI element.

The weighting instructions 246 can assign score weights for a given screen, based on UI elements contained in the given screen. The testing coverage engine is to identify the testing coverage score for the given screen according to which UI elements of the given screen are covered by the test.

Testing coverage instructions 248 may function to automatically identify, based on an analysis of gaze data and the UI elements, a testing coverage of the AUT. In some implementations, the testing coverage of the AUT may include the testing coverage of principal application screens identified based on test executions of the AUT. For example, when testing coverage instructions 246 are executed by processor 220, testing coverage instructions 246 may cause processor 220 to map gaze points in the gaze data to UI element areas on the principal application screens (e.g., based on gaze point coordinates and UI element area coordinates on the principal application screens, such as those described below with respect to, for example, FIG. 8), determine whether each of the UI element areas includes a particular number of gaze points or a particular time of fixation, identify a UI element area of the areas as covered if the UI element area includes the particular number of gaze points or the particular time of fixation, and/or identify the UI element area as not covered if the UI element area does not include the particular number of gaze points and does not include the particular time of fixation. As another example, when testing coverage instructions 246 are executed by processor 220, testing coverage instructions may cause processor 220 to generate a testing coverage report of the testing coverage.

Figure 3:
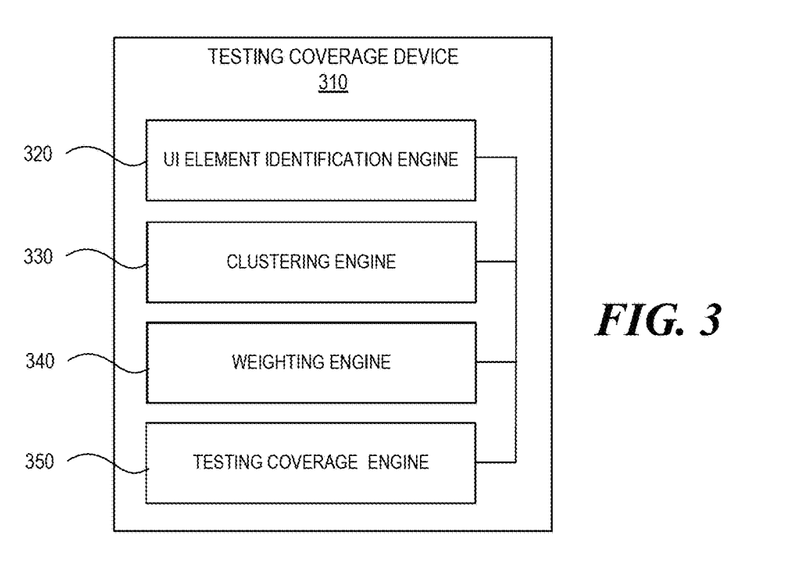
FIG. 3 is a block diagram of an example testing coverage device consistent with disclosed implementations.

FIG. 3 is a block diagram of an example testing coverage device 310 consistent with disclosed implementations. In certain aspects, testing coverage device 310 may correspond to testing coverage device 110 of FIG. 1 and/or testing coverage device 210 of FIG. 2. Device 310 may be implemented in various ways. For example, device 310 may be a special purpose computer, a server, a mainframe computer, and/or any other suitable type of computing system. In the example shown in FIG. 3, device 310 may include a user interface ("UI") element identification engine 320, a clustering engine 330, a weighting engine 340, and a testing coverage engine 350.

Engines 320, 330, 340, and 350 may be electronic circuitry for implementing functionality consistent with disclosed examples. For example, engines 320, 330, 340, and 340 may represent combinations of hardware devices and programming to implement functionality consistent with disclosed implementations. In some examples, the functionality of engines 320, 330, 340, and/or 350 may correspond to operations performed by testing coverage device 210 of FIG. 2, such as operations performed when instructions 242, 244, 246, and/or 248 are executed by processor 220 (described above with respect to FIG. 2).

In FIG. 3, UI element identification engine 320 may represent a combination of hardware and programming that performs operations similar to those performed when processor 220 executes UI element identification instructions 242, For example, UI element identification engine 320 may identify UI elements of an application under test based on image processing analysis of principal application screens, which can be obtained by periodic capture of images from display devices that are displaying a test execution in a set of test executions. The images may be, for example, the set of screenshots or may be video of the test execution, from which the set of screenshots may be extracted.

Similarly, clustering engine 330 may represent a combination of hardware and programming that performs operations similar to those performed when processor 220 executes clustering instructions 244. For example, clustering engine 330 may cluster UI elements from principal application screens into at least one cluster based on at least one feature of the UI elements.

Weighting engine 340 may represent a combination of hardware and programming that performs operations similar to those performed when processor 220 executes weighting instructions 246. For example, in some implementations, weighting engine 340 may assign score weights to the UI elements of a given screen according to which of the at least one cluster that a given one of the UI elements is clustered in. The score weights can be assigned on a per-screen basis.

Testing coverage engine 350 can identify a testing coverage score of the application under test based on the score weights of which UI elements are covered by the test. The testing coverage engine 350 may use interaction data from users, such as mouse clicks, touches, and also may cause the capture of gaze data and/or other input data during the test executions, such as the capture of gaze data and/or input data during manual test executions and the capture of input data during automated test executions. As another example, testing coverage engine 350 may identify, based on an analysis of the input data and the gaze data, a total testing coverage of the principal application screens. The testing coverage engine 350 may combine such input testing coverage results with score weights to identify a total testing coverage score.

Figure 4:
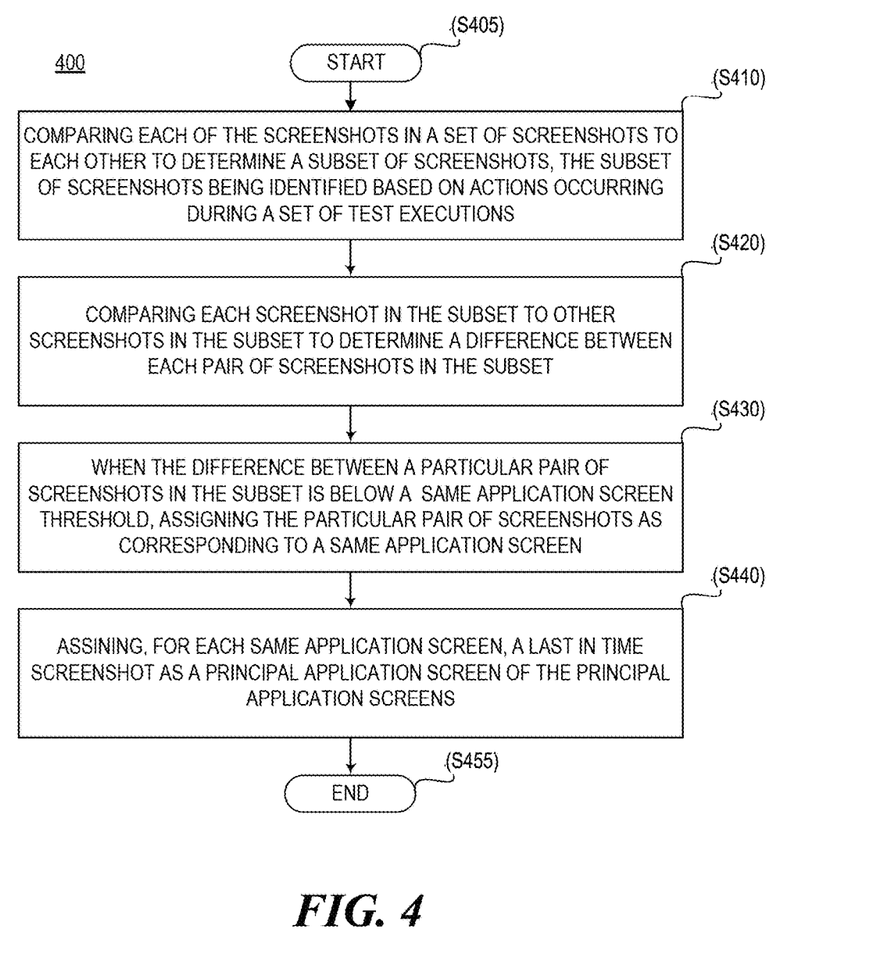
FIG. 4 is a flow chart of an example process for identifying principal application screens consistent with disclosed implementations.

Referring to FIG. 4 (and FIG. 7), flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 4 is a flow chart of an example process 400 for identifying principal application screens consistent with disclosed implementations. Such application screens can be used by system 100 of FIG. 1 and/or other suitable systems and devices for execution of at least one block of process 400. For example, processes described below as being performed by testing coverage device 110 may be performed by testing coverage device 210, testing coverage device 310, and/or any other suitable device. Process 400 may be implemented in the form of executable instructions stored on a machine-readable storage medium and/or in the form of electronic circuitry.

Process 400 may start (block S405) after a set of screenshots of test executions of the AUT have been captured. For example, during manual testing of the AUT, system 100 (e.g., testing coverage device 110) may cause the capture of screenshots from screens displaying the manual tests, such as, for example, display device 124 of client device 120. As another example, the capture of screenshots may be performed by a component external to system 100. In some implementations, the set of screenshots may be captured at particular point(s) in time. For example, the screenshots may be captured during every 50 ms of each test execution, thereby creating a sequence of consecutive screenshots.

Process 400 may include comparing each of the screenshots in the set of screenshots to each other to determine a subset of screenshots, the subset of screenshots being identified based on actions occurring during a set of test executions (block S410). For example, during a test execution of the AUT, there may be actions that occur that are reflected in the visual output of the AUT, such as a tester entering an input, the application responding, the application producing output, and the like. Between these events, there may be times where no action is occurring. For example, the application may be waiting for user input or may be processing data without any output or change being made to the visual display. The subset of screenshots may be identified so as to correspond to the points in time at which actions are occurring as reflected on the display device showing the visual output of the AUT, while screenshots from the times between these moments of action will not be identified for the subset. Screenshots that are part of the subset (e.g., screenshots that document actions occurring during the test execution) may be considered to be principal application screens.

In some implementations, the principal application screens may be identified by testing coverage device 110. For example, testing coverage device 110 may compare each of the screenshots to each other to identify the subset of screen shots. In some implementations, the comparison may include determining a degree of change between consecutive pairs of screenshots in the set of screenshots. For example, testing coverage device 110 may compare each screenshot to a previous screenshot in the set of screenshots using image comparison techniques to identify differences between the screens (e.g., a change in the AUT display). When the degree of change of a consecutive pair of the consecutive pairs exceeds a subset threshold (e.g., the difference is greater than a predetermined amount), testing coverage device 110 may assign a last in time screenshot of the consecutive pair to the subset of screenshots. For example, if the screenshots that are being compared include two images related to two different AUT screens, the degree of change may exceed the threshold. As another example, if the screenshots that are being compared include two images related to the same AUT screen but one may include data entered into a field by a manual tester while the other does not, the degree of change may also exceed the threshold. However, if the screenshots that are being compared include two images related to the same AUT screen but one may include a cursor located in a first position while the other may include a cursor located in a second position, the degree of change may not exceed the threshold.

Process 400 may also include comparing each screenshot in the subset to other screenshots in the subset to identify a difference between each pair of screenshots in the subset (block S420). For example, the screenshots may be compared using image processing techniques whereby samples of each of the screenshots are taken and compared to each other. In some implementations, the comparison of each screenshot in the subset is based on assigning greater weights to particular areas of each of the screenshots. For example, differences between the upper part and/or left part of the screenshot may be given greater weight as a number of applications include menus at these locations.

Process 400 may also include, when the difference between a particular pair of screenshots in the subset is below a same application screen threshold, assigning the particular pair of screenshots as corresponding to a same application screen (block S430). For example, during the test of an AUT, a number of different screens may be presented. On any such screen, any number of actions might occur such as, for example, two different parameters being input by a tester to a single application screen. Each of those inputs may be considered to be an action occurring during the test execution, and each may be represented by a screenshot that may be considered to be a "principal application screen," but both would correspond to the same application screen. If the application then presents a new screen, there may be a subsequent number of actions and significant frames associated with that next application screen. If the differences between the significant frames are below a same application screen threshold, this may indicate that the frames are substantially identical, indicating that both come from the same underlying application screen. In this case, the screenshots may be grouped as corresponding to a same application screen. This may continue until all the screenshots have been evaluated. Thus, in some implementations, the same application screen threshold may be a low value to account for small differences between the pairs of screenshots. Furthermore, in some implementations, testing coverage device 110 may select, for each screenshot assigned as corresponding to the same application screen, a last in time screenshot as representing the same application screen. For example, to reduce the size of stored testing coverage data, the last principal application screen for each same application screen may be stored as testing coverage data 136 in repository 130. In some implementations, testing coverage device 110 may assemble the screenshot(s) representing the same application screens to generate an application flow performed during a specific test execution.

In some implementations, testing coverage device 110 may assign various screenshots from different test executions (either from a single tester or multiple tester) as corresponding to a same application screen. For example, an application screen can have dynamic content (e.g., a table). Thus, if different users are performing different tests or are testing the AUT using different test flows, the content can change. In other words, the different tests may be testing the same screen, but different information is displayed. Testing coverage device 110 may identify that screenshots belonging to different tests may also correspond to the same application screen using techniques that are the same as or similar to those described above. Thus, in some examples, information related to multiple test executions of the AUT may be aggregated to determine the testing coverage. Once blocks S410, S420, S430, and/or S440 are complete, process 400 may end (block S455).

Figure 5:
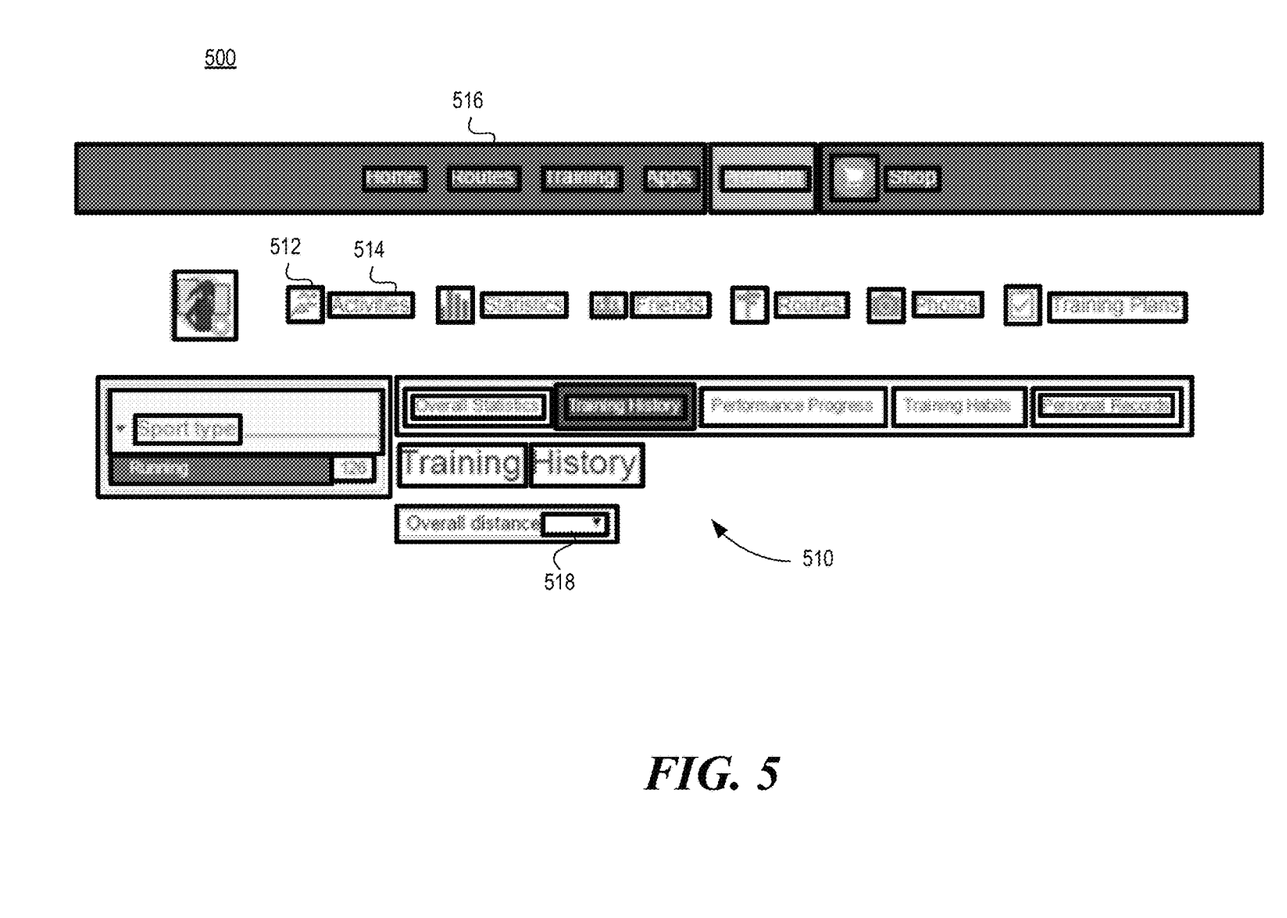
FIG. 5 is an illustration of an example screen of an application under test consistent with disclosed implementations.

FIG. 5 is an illustration of an example screen 500 of an application under test consistent with disclosed implementations. The screen 500 illustrates a plurality of UI elements 510, including graphical UI elements 512, text UI elements 514, menu UI elements 516, control UI elements 518, and so on.

A given application can have a certain look and feel or design created by UI designer or developer, where menus, buttons, labels, etc, have certain characteristics such as color, size, texture, font, etc. Some example implementations described herein can learn the look and feel of an application, and automatically classify (cluster) the UI elements 510 with high accuracy. Example implementations do not need to identify whether a specific one of the UI elements 510 happens to be a menu, a button, or a label. Rather, example implementations can identify similar elements to be grouped together into a cluster, and identify whether a given UI element 510 is a member of a given cluster.

Example implementations can perform UI element locating and classification based on image processing techniques to identify UI elements 510 on at least one of the application screens 500. The techniques used can include converting a screen image to a gray-scaled image, improving image contrast using an adaptive threshold, blurring the image to reduce minor details that are not significant for purposes of classifying a UI element, finding contours, and/or creating, from elements found in at least one of the application screens, a list of children elements (those elements that do not contain other elements). In an example implementation, an element can be associated with a unique ID and identifiers to indicate features, such as at least one text flag(s).

The results of such an approach is shown in FIG. 5, where identified UI elements 510 are indicated by being enclosed by corresponding rectangles. As illustrated, the identified UI elements 510 can share common features, and can have distinctive features, which can be used to cluster the UI elements 510 as set forth in further detail below with respect to FIG. 6.

Figure 6:
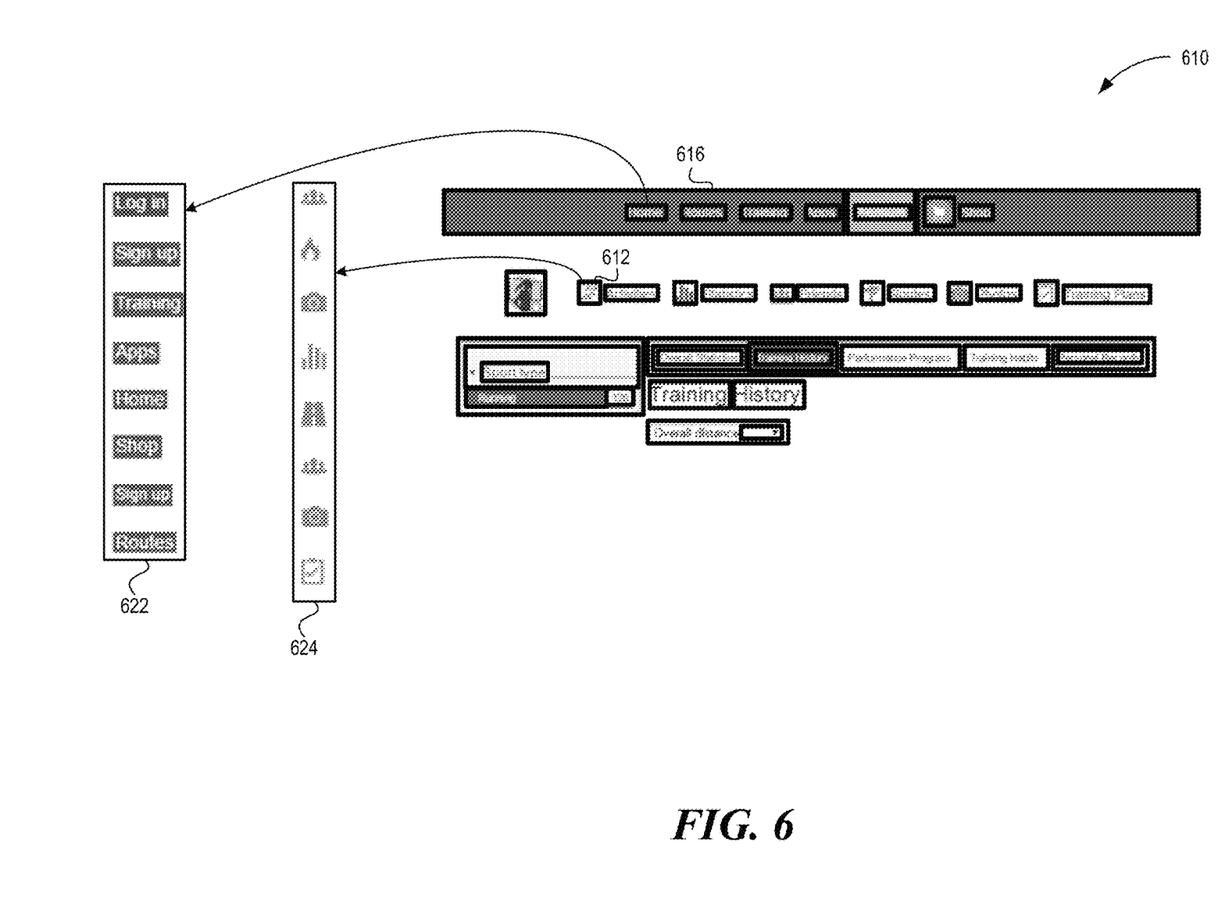
FIG. 6 is an illustration of an example first cluster, an example second cluster, and an example screen of an application under test consistent with disclosed implementations.

FIG. 6 is an illustration of an example first cluster 622, an example second cluster 624, and an example screen 610 of an application under test consistent with disclosed implementations. The example screen 610 includes menu UI elements 616 and graphical UI elements 612, among others.

Example implementations can cluster the UI elements into clusters 622, 624 using machine learning, e.g., by using the identified UI elements 510 as set forth above with respect to FIG. 5. A list of feature(s) is created for a given UI element such as graphical UI elements 612 or menu UI elements 616. The features identified by example systems described herein may include a histogram of colors or intensity for the UI element, a dominant color, whether a UI element contains text (e.g., indicating the UI element is possibly an interface button) or does not contain text (e.g., indicating the UI element is possibly an interface graphic/icon), and so on.

At least one feature may be used to cluster the UI elements. Even using a single feature, a histogram of colors, provides useful clustering results. Example implementations can use Optical Character Recognition (OCR) to distinguish between i) UI elements having text, and ii) UI elements not having text. Such distinction can be made before performing the clustering, to further classify and cluster UI elements. Example implementations can apply at least one clustering approach, separately or in combination, and in different order of application, to achieve varying levels of clustering. Example implementations can run machine learning unsupervised clustering techniques, such as K-means, to cluster the UI elements based on selected features.

As a result of the above approaches, a collection of screen images of an application under test are obtained, grouped by categories found by the clustering technique. For example, if the screen image includes menu UI elements 616, one of the clusters (first cluster 622) may contain the images of all menu UI elements 616 used in the application. Such clustering is possible without needing to identify that the specific UI elements happen to be menus in particular. Rather, the clustering can detect that those UI elements (which happen to be menu UI elements 616) have the same look and feel, and put them in the same group/cluster.

In the example of FIG. 6, UI elements in one application were identified as belonging to the same category for the first cluster 622, and also for the second cluster 624. It is evident that the look and feel of UI elements in a given cluster are similar and belong to the same category, but that UI elements of the first cluster 622 have a different look and feel of the UI elements of the second cluster 624.

With at least one cluster 622, 624 identified, example implementations can find a best match between i) a given UI element 612, 616 of the various application screen(s) 610, and ii) the clustered UI elements in the first and second clusters 622, 624. Best matches between the UI elements can be performed (e.g., by a weighting engine) using approaches such as template matching image processing techniques. In an example implementation, the weighting engine can use the first cluster 622, which contains similar UI elements that happen to be menus UI elements, to mark those UI elements in the screen 610 that are similar to the elements of the first cluster 622. Accordingly, it is possible to mark and weight the "Home" menu UI element 616 in the application screen 610 as belonging to cluster 622 that happens to contain other menu elements, based on the look and feel of the "Home" menu UI element 616 and its similarity to first cluster 622, even though the specific text "Home" is not contained in the first cluster 622. Example implementations can compare the identified UI elements (enclosed by rectangles in the screen 610) with the identified clusters. In an example, an element may fit as a member of multiple clusters, and may be given multiple weights accordingly. With the various UI elements classified/weighted for a given screen 610, the UI coverage score can be calculated (e.g., by a testing coverage engine) using the various weights per different UI element category/cluster. Accordingly, if a highly weighted UI element is covered in an application flow during testing, the testing coverage score is highly increased accordingly. If that UI element is missed, its significance is reflected in the correspondingly lower testing coverage score. In contrast, a relatively unsignificant passive message associated with a low weight (e.g., due to not matching a cluster associated with a score, and/or matching a cluster having a low score) can be skipped during the test flow, without much affect (if any) to the overall testing coverage score due to the elements low score.

In addition to visual classification of the elements, user actions/behavior can be used to give more or less weight to a given UI element category/cluster. For example, the identification engine can detect that a UI element has been clicked by a user. The clustering engine can use that user interaction information to associate the corresponding cluster (which would contain the clicked UI element) as being "clickable." The clustering engine, by inferring that other UI elements belonging to that "clickable" category/cluster are "clickable," can give more impact to those elements when giving them more weight when contributing to the UI coverage score. Accordingly, the weighting engine can give those elements higher weights when calculating the UI coverage score function.

Another form of user interaction that can be identified as part of the weighted function is a number of times the specific UI element has been covered, in a given test run and/or across a plurality of test runs. As the number of test flows (i.e., the actions taken when progressing through the AUT in a given run) involving a specific application screen and/or UI elements increases, the coverage for those screens/elements becomes more thorough, and the weight of the corresponding specific UI element(s) can be increased, and the increase can be made based on the thoroughness of coverage independent of the UI element's existing category/cluster.

The weights for UI element categories can be automatically assigned by the weighting engine, which can also allow for manual editing and customization by a tester. For example, a tester can run a test to check for a specific type of coverage, and increase/customize the score(s) for elements corresponding to the specific type of coverage being checked. The certain actions a user might perform to elements during the test can give additional insight to the tester as to how significant such types of elements may be. Additionally, a particular instance of a UI element in a particular screen may be given a custom weight. For example, perhaps the same menu item appears in ten different screens, but for testing purposes, the third screen menu item is to be clicked. In such case, that particular screen's particular menu item can receive an increased score, without needing to affect the score of other UI element(s) that may be member(s) of the same cluster(s) with the particular UI element being customized. Similarly, a given element's score can be adjusted independently, without adjusting the score of the entire cluster. The UI coverage score of an application screen can be calculated for a single test run, for multiple tests runs of the same tests or aggregated for multiple tests (e.g., for multiple tests that use the specific application screen as part of their test flow).

Figure 7:
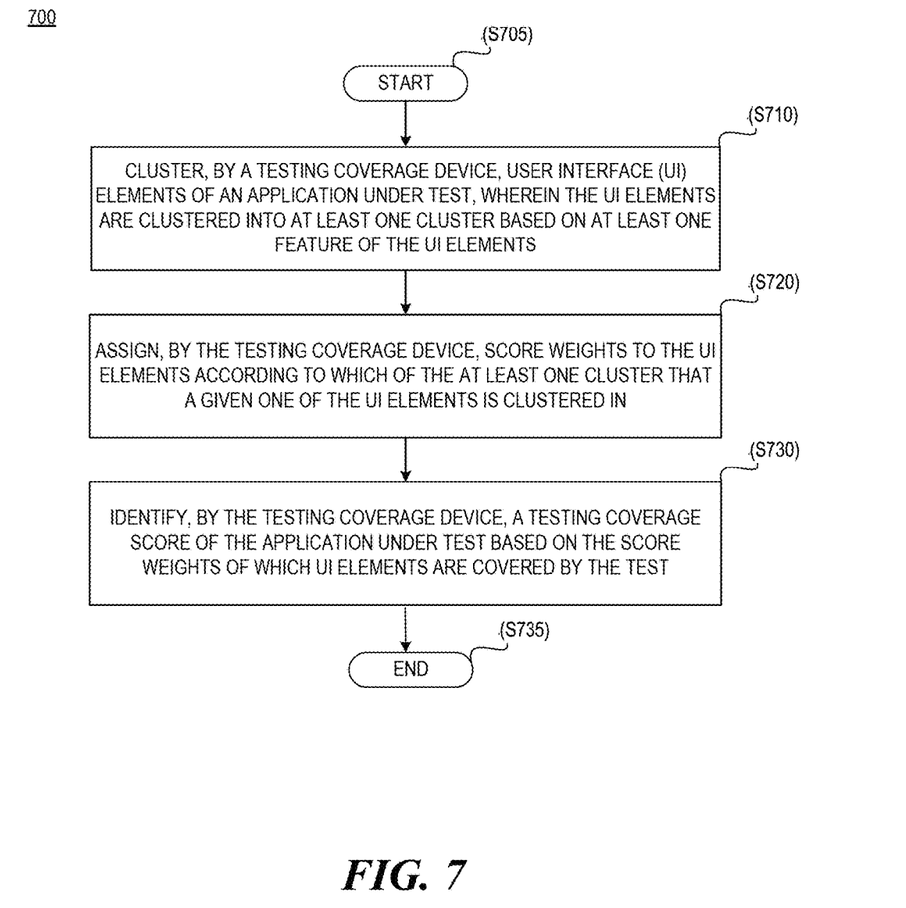
FIG. 7 is a flow chart of an example process for identifying testing coverage scores consistent with disclosed implementations.

FIG. 7 is a flow chart 700 of an example process for identifying testing coverage scores consistent with disclosed implementations. Flow starts at block S705. In block S710, a testing coverage device is to cluster User Interface (UI) elements of an application under test. The UI elements are clustered into at least one cluster based on at least one feature of the UI elements. For example, a histogram can be applied to a UI element to obtain a numerical value, and machine learning unsupervised clustering can be used to cluster elements having similar histogram values. In block S720, the testing coverage device is to assign score weights to the UI elements according to which of the at least one cluster that a given one of the UI elements is clustered in. For example, the testing coverage device can consider a given screen of a test run, identify a UI element that was covered, and assign that UI element a score corresponding to a score of whichever cluster(s) that UI element is a member of. In block S730, the testing coverage device is to identify a testing coverage score of the application under test based on the score weights of which UI elements are covered by the test. For example, a plurality of application screens can be covered in a test flow, each having multiple covered UI elements. Each element, if matched to a corresponding cluster, can be assigned scores automatically, indicating how significant the element is and reflecting its significance in the overall score total by adding its individual score contribution if covered in the test. Flow ends at block S735.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct a testing coverage engine to automatically identify a testing coverage score, wherein the engine(s) include any combination of hardware and/or software to execute the instructions described herein. As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A system comprising:
an identification engine to identify, based on an image processing analysis of screens of an application under test, User Interface (UI) elements of the application under test;
a clustering engine to cluster the UI elements into at least one cluster based on at least one feature of the UI elements;
a weighting engine to assign score weights to the UI elements according to which of the at least one cluster that a given one of the UI elements is clustered in; and
a testing coverage engine to automatically identify, based on the score weights of which of the UI elements are covered by the test, a testing coverage score of the application under test.

2. The system of claim 1, wherein the clustering engine is to cluster the UI elements based on the at least one feature including a histogram of colors of the UI elements or a histogram of intensity of the UI elements.

3. The system of claim 1, wherein the clustering engine is to perform Optical Character Recognition (OCR) on the UI elements, and group the UI elements into a first group of those UI elements including text, and a second group of those UI elements not including text, and apply clustering to the first group distinct from the second group.

4. The system of claim 1, wherein the clustering engine is to cluster the UI elements based on a machine learning unsupervised clustering technique.

5. The system of claim 1, wherein the weighting engine is to assign a score weight to a given UI element of a given cluster based on a degree of user interaction with other UI elements of that given cluster to which the given UI element is clustered in.

6. The system of claim 5, wherein the user interaction is based on a mouse click on the UI element.

7. The system of claim 5, wherein the user interaction is based on user eye gaze duration on the UI element.

8. The system of claim 1, wherein the weighting engine is to assign a score weight to a given UI element based on a number of times with which that given UI element has been interacted, independent from the given UI element's cluster.

9. The system of claim 1, wherein the weighting engine is to assign score weights according to a customizable score assigned to a given cluster.

10. The system of claim 1, wherein the weighting engine is to assign a score weight to a given UI element according to a customizable score assigned to that particular UI element.

11. The system of claim 1, wherein the weighting engine is to assign score weights for a given screen, based on UI elements contained in the given screen, and wherein the testing coverage engine is to identify the testing coverage score for the given screen according to which UI elements of the given screen are covered by the test.

12. A method, comprising:
identifying, by a testing coverage device, user interface (UI) elements of an application under test based on an analysis of screens of the application under test;
clustering, by the testing coverage device, the UI elements of the application under test into at least one cluster based on at least one feature of the UI elements;
assigning, by the testing coverage device, score weights to the UI elements according to which of the at least one cluster that a given one of the UI elements is clustered in; and
identifying, by the testing coverage device, a testing coverage score of the application under test based on the score weights of which UI elements are covered by the test.

13. The method of claim 12, wherein the at least one feature of the UI elements includes histograms automatically determined by the testing coverage device for the UI elements.

14. A non-transitory machine-readable storage medium encoded with instructions executable by a computing system that, when executed, cause the computing system to:
identify user interface (UI) elements of an application under test based on an image processing analysis of screens of the application under test;
cluster the UI elements into at least one cluster based on at least one feature of the UI elements;
assign score weights to the UI elements of a given screen according to which of the at least one cluster that a given one of the UI elements is clustered in, wherein the score weights are assigned on a per-screen basis.

15. The storage medium of claim 14, further comprising instructions that cause the computing system to automatically identify a testing coverage score of the application under test based on the score weights of which UI elements are covered by the test.

16. The storage medium of claim 14, further comprising instructions that cause the computing system to perform Optical Character Recognition (OCR) on the UI elements, and group the UI elements into a first group of those UI elements including text, and a second group of those UI elements not including text, and apply clustering to the first group distinct from the second group.

17. The storage medium of claim 14, further comprising instructions that cause the computing system to cluster the UI elements based on a machine learning unsupervised clustering technique.

18. The storage medium of claim 14, further comprising instructions that cause the computing system to assign a score weight to a given UI element of a given cluster based on a degree of user interaction with other UI elements of that given cluster to which the given UI element is clustered in.

19. The storage medium of claim 14, further comprising instructions that cause the computing system to assign score weights according to a customizable score assigned to a given cluster.

20. The storage medium of claim 14, further comprising instructions that cause the computing system to assign a score weight to a given UI element according to a customizable score assigned to that particular UI element.

* * * * *